US006481907B2

(12) United States Patent
Banach et al.

(10) Patent No.: US 6,481,907 B2
(45) Date of Patent: Nov. 19, 2002

(54) CONTACT PROGRAMMER

(75) Inventors: Matthew Banach, Gurnee, IL (US);
Larry Ancahas, Gurnee, IL (US); Clive P. Hohberger, Glencoe, IL (US)

(73) Assignee: ZIH Corporation, Wilmington, DE (US)

( * ) Notice: Subject to any disclaimer, the term of this patent is extended or adjusted under 35 U.S.C. 154(b) by 89 days.

(21) Appl. No.: 09/797,460

(22) Filed: Mar. 1, 2001

(65) Prior Publication Data

US 2001/0024160 A1 Sep. 27, 2001

Related U.S. Application Data

(60) Provisional application No. 60/186,131, filed on Mar. 1, 2000.

(51) Int. Cl.[7] .................................................. B41J 11/26
(52) U.S. Cl. .................................................... 400/615.2
(58) Field of Search .............................. 400/615.2, 61, 400/70, 76; 340/10.51, 10.52, 572.8, 572.1

(56) References Cited

U.S. PATENT DOCUMENTS

| 4,900,386 | A | | 2/1990 | Richter-Jorgensen |
| 5,629,981 | A | | 5/1997 | Nerlikar |
| 5,660,663 | A | | 8/1997 | Chamberlain et al. |
| 5,838,253 | A | | 11/1998 | Wurz et al. |
| 6,246,326 | B1 | * | 6/2001 | Wiklof et al. ............ 340/572.1 |

FOREIGN PATENT DOCUMENTS

AU           199942439           8/1999

* cited by examiner

Primary Examiner—John Barlow
Assistant Examiner—Michael S Brooke
(74) Attorney, Agent, or Firm—Trexler, Bushnell, Giangiorgi, Blackstone & Marr, Ltd.

(57) ABSTRACT

A printer is provided for programming a radio frequency identification (RFID) label and may be used to print indicia on the RFID label. The printer has a pin module which can be raised to engage the RFID label during processing of the RFID label through the printer so that the RFID label can be programmed.

22 Claims, 4 Drawing Sheets

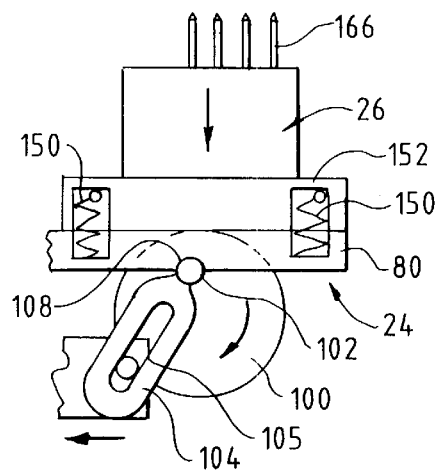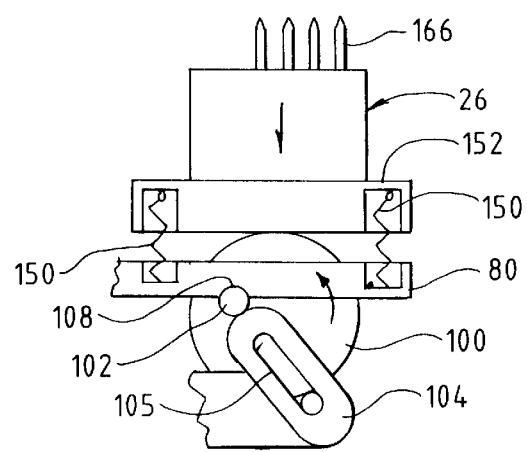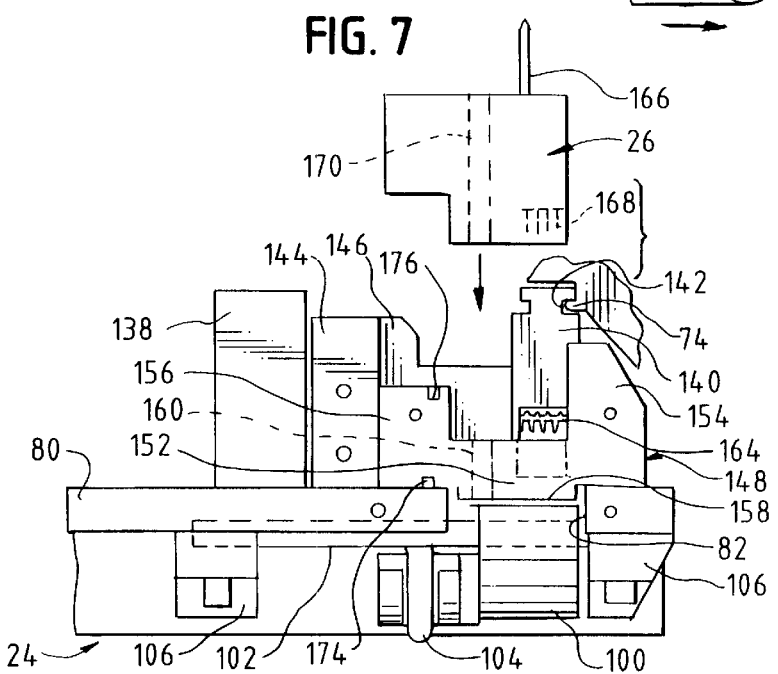

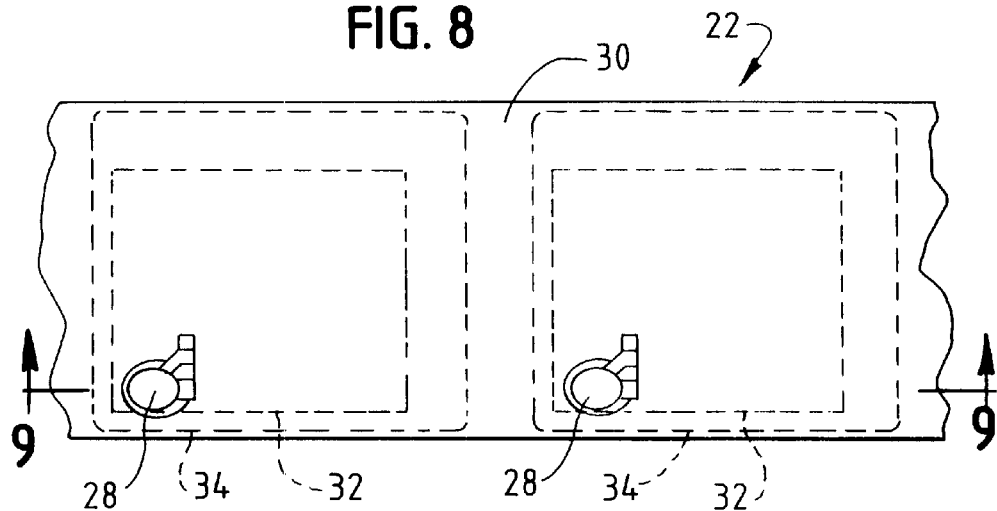
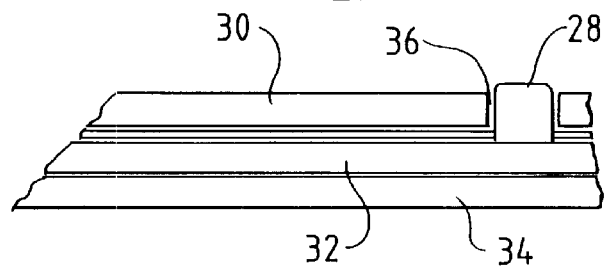

CONTACT PROGRAMMER

This application claims the domestic priority of U.S. provisional application Ser. No. 60/186,131 filed on Mar. 1, 2000 and entitled "Contact Printer".

BACKGROUND OF THE INVENTION

This invention is generally directed to a novel contact printer which is capable of programing a radio frequency identification label. The contact printer of the present invention can also be used to print desired indicia on the radio frequency identification label.

One type of prior art label is a two-dimension label which is printed on by a printer, such as a thermal demand printer. Because of space limitations on the label, a limited amount of information can be provided on the label.

Radio frequency identification (RFID) labels are being used more frequently today. RFID labels includes a transponder which can be encoded with a large amount of information. Significantly more information can be provided on the RFID label than on conventional two-dimensional labels.

The present invention provides a novel contact printer which is capable of programming a radio frequency identification label and may be used to print desired indicia on the radio frequency identification label during the printing process. Features and advantages of the present invention will become clear upon a reading of the attached specification in combination with a study of the drawings.

OBJECTS AND SUMMARY OF THE INVENTION

A general object of the present invention is to provide a novel contact printer which capable of programing a radio frequency identification (RFID) label and may be used to print desired indicia on the RFID label.

An object of the present invention is to provide a novel contact printer which includes a pin module which can be easily replaced.

Briefly, and in accordance with the foregoing, the present invention discloses a novel contact printer, which is preferably a thermal demand printer, which is capable of programming a radio frequency identification (RFID) label and may be used to print indicia on the RFID label. The printer has a pin module which can be raised to engage the RFID label during processing of the RFID label through the printer so that the RFID label can be programmed.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 5 is a cross-sectional view of the pin lift mechanism along line 5—5 of FIG. 4 and showing the pin module attached thereto;

FIG. 6 is a cross-sectional view of the pin lift mechanism showing the pin lift mechanism in a second position and showing the pin module attached thereto;

FIG. 7 is a side elevational view of the pin lift mechanism in a first position, showing the pin module in side elevation and exploded therefrom, and showing a fragmentary portion of the contact printer;

FIG. 8 is a bottom plan view of a radio frequency identification (RFID) label used with the contact printer of the present invention;

FIG. 9 is a cross-sectional view of the RFID label along lines 9—9 of FIG. 8; and FIG. 10 is a enlarged cross-sectional view of the RFID label shown circled in FIG. 9.

DETAILED DESCRIPTION OF THE ILLUSTRATED EMBODIMENT

Figure 1:
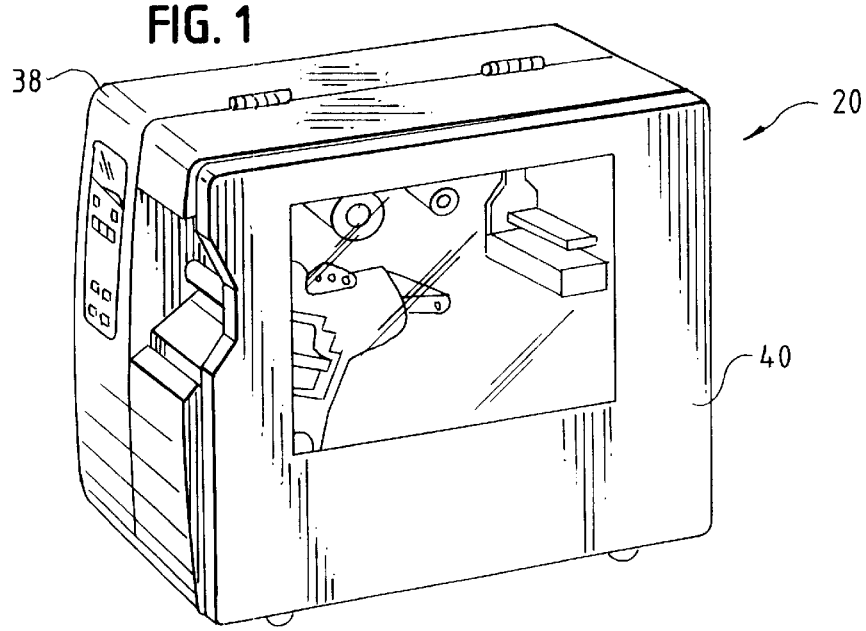
FIG. 1 is a perspective of a contact printer which incorporates the features of the invention.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

The present invention provides a novel contact printer 20 which is capable of programing and printing indicia on a radio frequency identification (RFID) label 22. It is to be understood that pre-printed RFID labels can also be fed through the contact printer 20 and encoded without printing indicia thereon.

The contact printer 20 includes a pin lift mechanism 24 which lifts a pin module 26 into contact with a programming pad 28 of the RFID label 22 as the RFID label 22 is being fed through the contact printer 20. Suitable electronics connected to pin module 26 programs the desired information into the RFID label 22. Preferably, the contact printer 20 is a thermal demand printer.

As shown in FIGS. 8–10, the RFID label 22 used with the contact printer 20 includes a liner 30 onto which a transponder 32 is secured by a layer of adhesive. A media 34, such as a label, is secured to the transponder 32 such that the transponder 32 is between the label 34 and the liner 30. The programming pad 28 is on the transponder 32. A cutout 36 is provided through the liner 30 so that the programming pad 28 is exposed so that the pin module 26 of the contact printer 20 can contact the programming pad 28 as the RFID label 22 is fed through the contact printer 20.

To allow the programming pad 28 in the RFID label 22 to be properly programmed by the contact printer 20, the formation of the label 22 is critical. The label 22 must be manufactured with tight tolerances to ensure proper placement of the programming pad 28 as the label 22 is fed through the contact printer 20. To form the RFID label 22, the cutout 36 is formed in the liner 30. A layer of adhesive is placed around the edges of the back surface of the transponder 32 (the surface with the programming pad 28). The transponder 32 is then precisely placed on the liner 30 such that the programming pad 28 is aligned with the cutout 36. A releasable backing (not shown) which has been provided on the top surface of the transponder 32 is removed to expose the adhesive provided on the top surface of the transponder 32. Finally, the label 34 is adhered to the top surface of the transponder 32 by the adhesive. Multiple transponders 32 and labels 34 can be placed on a continuous roll of liner 30 in this manner at spaced apart intervals. As described herein, the continuous roll of liner 30 having multiple transponders 32 and labels 34 provided thereon is defined as a media stream.

A perspective view of the contact programmer 20 is shown in FIG. 1. The contact programmer 20 has a housing 38 which houses various operating components of the contact programmer 20. The housing 38 has a plurality of ports, serial and/or parallel, thereon for connection to external devices, such as a CPU and a monitor, a plug for connection of a power source thereto, and an on/off switch for turning the contact programmer 20 on or off. Ventilation apertures are provided on the housing 38. A cover 40 which forms part of the housing 38 can be lifted to expose operating components within the housing 38. A central support wall 42 is provided within the housing 38 and extends perpendicularly from a bottom wall 44 of the housing 38 and is secured thereto.

Figure 2:
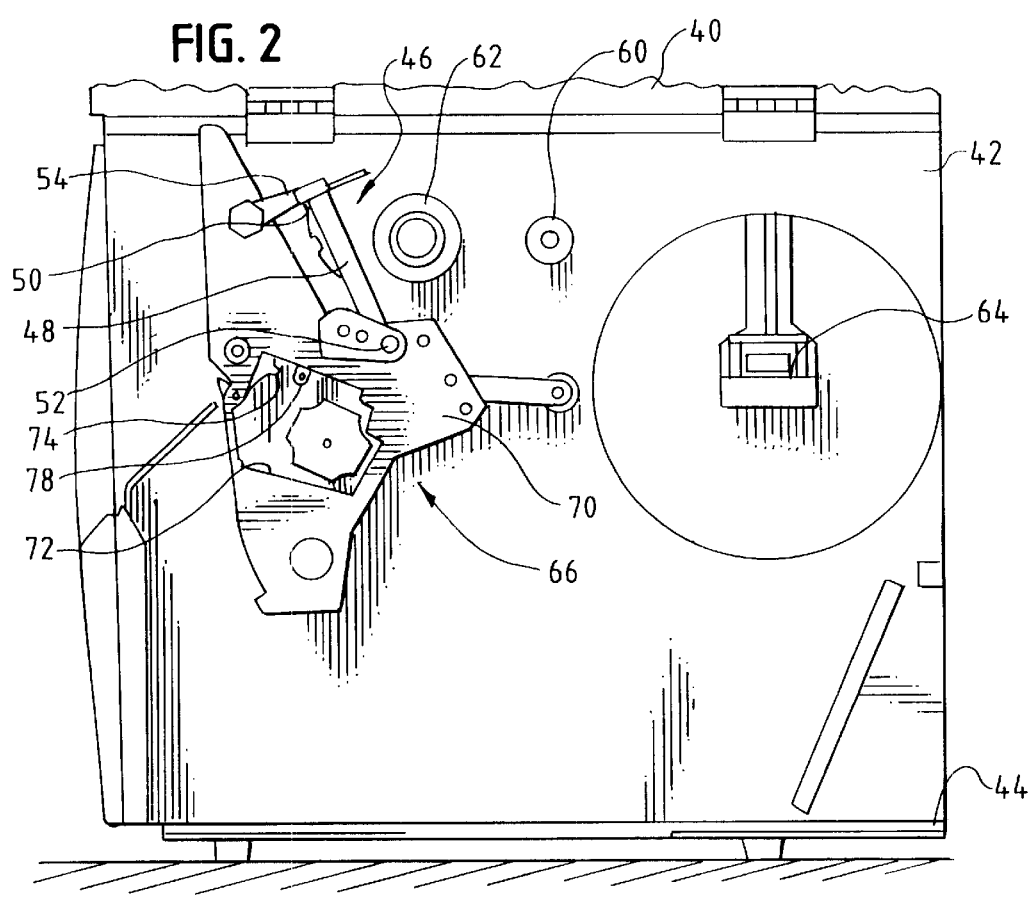
FIG. 2 is a partial side elevational view of the contact printer with a cover of the contact printer open and a pin lift mechanism and pin module removed.

FIG. 2 shows the internal components of the contact programmer 20 on one side of the central support wall 42. The electronics are provided on the other side of the central support wall 42.

A printhead assembly 46 is provided and includes a printhead support 48 and a conventional printhead means 50 fixedly attached thereto. The printhead means 50 is comprised of an array of heating elements which are selectively energized. Energizing selected heating elements of the array produces a single line of a printed image by heating a thermally sensitive paper, ribbon, or the like. While ribbon is described herein, it is to be understood that these other types of image transferring means are suitable. Complete images are printed by repeatedly energizing varying patterns of the heating elements while moving the RFID label 22 past the printhead means 50. Power to the printhead means 50 is supplied by a power source which is wired thereto by a cable which passes from the power supply through the central support wall 42.

The printhead support 48 is pivotally attached to the central support wall 42 by conventional means at point 52. A conventional toggle means 54 for locking the printhead assembly 46 in a horizontal position is provided.

A positively-driven, cylindrical platen roller 56 extends perpendicularly outwardly from the central support wall 42 and is rotatably mounted thereto. The platen roller 56 has a shaft that extends through the central support wall 42 and connects with a conventional driving means (not shown). When the printhead assembly 46 is in a horizontal position, the printhead means 50 is proximate to the platen roller 56. When the printhead assembly 46 is pivoted upwardly, the platen roller 56 is exposed.

A conventional tear bar 58 is provided proximate to the platen roller 56 for tearing off the printed on RFID label 22 after it exits the printhead means 50. A conventional sensor 60 is provided, such as an opacity sensor, on the tear bar 58 for determining when the front edge of the RFID label 22 is thereunder.

Conventional ribbon delivery means is provided for delivering the ribbon (not shown) to the printhead means 50. The ribbon delivery means includes a ribbon supply spindle 60 mounted on the central support wall 42 and a ribbon take-up spindle 62 mounted on the central support wall 42. The ribbon take-up spindle 62 is spaced apart from the ribbon supply spindle 60 on the central support wall 42.

The ribbon supply spindle 60 is cantilevered from the central support wall 42 such that the ribbon supply spindle 60 extends outwardly and perpendicularly from the central support wall 42. The ribbon supply spindle 60 is driven by suitable means which are known in the art such that the ribbon supply spindle 60 is rotatable relative to the central support wall 42.

The ribbon take-up spindle 62 is cantilevered from the central support wall 42 such that the ribbon take-up spindle 62 extends outwardly and perpendicularly from the central support wall 42. The ribbon take-up spindle 62 is driven by suitable means which are known in the art such that the ribbon take-up spindle 62 is rotatable relative to the central support wall 42. The ribbon take-up spindle 62 can include means for relieving tension on the wound ribbon. Such tension relieving means are know in the art.

Conventional media delivery means is provided for delivering the media stream to the printhead means 50. The media delivery means includes the positively-driven platen roller 56 and a media supply hangar 64. The media stream (the roll of multiple labels 22) is mounted on the media supply hangar 64.

Figure 3:
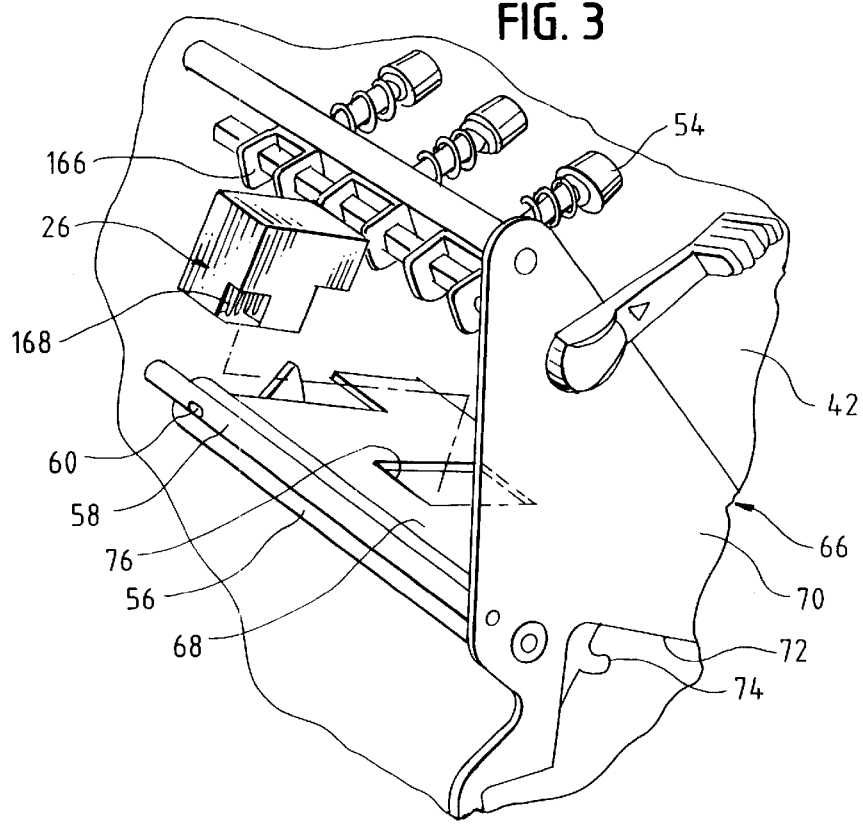
FIG. 3 is a fragmentary perspective view of the contact printer.

A pin housing 66 is provided on the central support wall 42 for suspending the pin lift mechanism 24 proximate to the platen roller 56. The pin housing 66 includes a generally horizontal plate 68, FIG. 3, which is cantilevered from the central support wall 42 and generally extends between the platen roller 56 and the pivot point of the printhead assembly 46. A vertical plate 70, FIGS. 2 and 3, is attached to the opposite end of the generally horizontal plate 68 and has an opening 72 therein which is provided below the generally horizontal plate 68. A flange 74 depends from the generally horizontal plate 68 such that the end of the flange 74 is exposed within the opening 72 in vertical plate 70.

A cutout 76, FIG. 3, is provided in the generally horizontal plate 68 at a position which is spaced from the platen roller 56. The pin lift mechanism 24 is inserted through the opening 72 in the vertical plate 70 and attached to the flange 74. The pin lift mechanism 24 is slid along the flange 74 until fully inserted. When fully inserted, a portion of the pin lift mechanism 24 is positioned underneath the cutout 76 in the generally horizontal plate 68. A stop 78 is provided for stopping the insertion of the pin lift mechanism 24 in the appropriate position.

Figure 4:
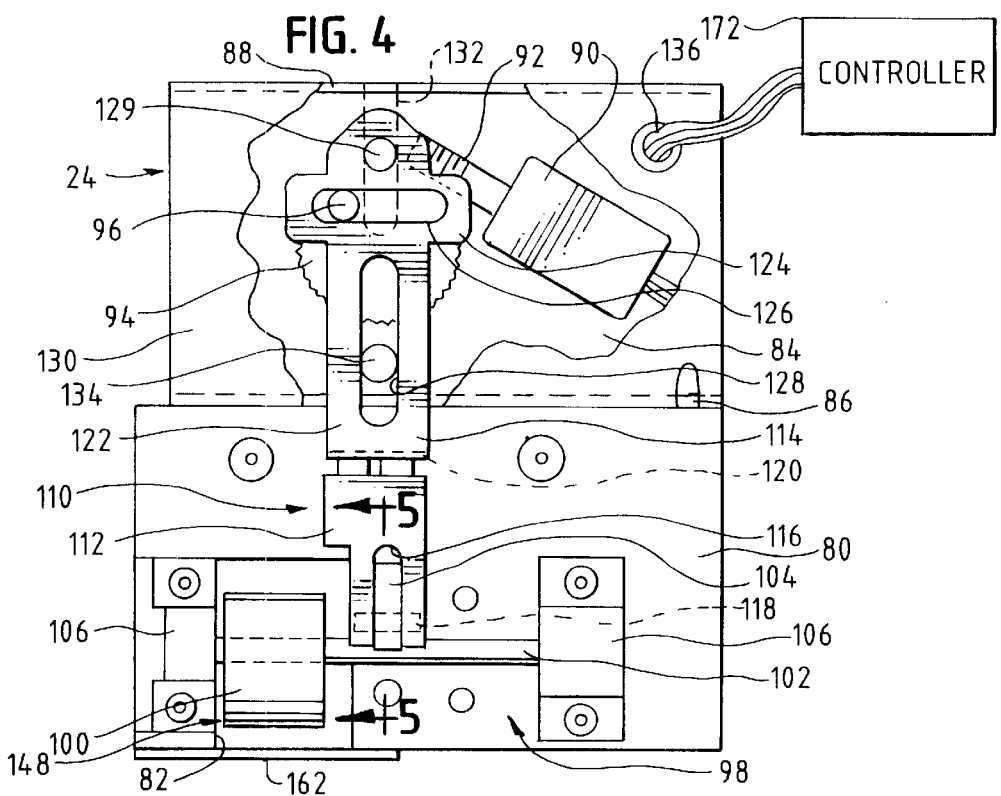
FIG. 4 is a bottom plan view of the pin lift mechanism with a cover portion partially broken away.

The pin lift mechanism 24 provides a seat into which the pin module 26 is removably mounted. As best shown in FIGS. 4 and 7, the pin lift mechanism 24 includes a generally rectangular, flat base plate 80 which has a variety of components mounted thereon. The base plate 80 has a first edge and a second edge.

A rectangular cut-out 82 is provided through the base plate 80. The rectangular cut-out 82 extends from the first edge of the base plate 80, inwardly into the base plate 80.

A generally U-shaped mounting member is mounted on the lower surface of the base plate 80 at a position which is spaced from the rectangular cut-out 82 and proximate to the second edge of the base plate 80. The generally U-shaped mounting member includes a base wall 84 which is mounted on the lower surface of the base plate 80 and a pair of spaced apart, parallel side walls 86, 88 which extend perpendicularly from the base wall 84. The base wall 84 is secured to the base plate 80 by suitable means, such as fasteners. Side wall 88 is generally aligned with the second edge of the base plate 80.

A DC motor 90 is suitably secured to the base wall 84 and between the side walls 86, 88. The DC motor 90 has a shaft 92 extending therefrom. The shaft 92 has a worm gear provided on the end thereof.

A gear 94 is rotatably mounted on the base wall 84 and between the side walls 86, 88 by an axially mounted a spindle. The worm gear on the shaft 92 engages with the teeth on the gear 94 such that rotational movement is imparted to the gear 94 when the DC motor 90 is driven. The gear 94 has a pin 96 mounted thereon and extending downwardly therefrom. The pin 96 is radially spaced from the axial center of the gear 94.

A cam assembly 98 is mounted on the lower of surface of the base plate 80 proximate to the first edge thereof. The cam assembly 98 includes a cylindrical cam member 100, a cam shaft 102 which extends through the cam member 100 and is rigidly affixed thereto, and an elongated member 104 which is welded to the cam shaft 102 at a point which is spaced from the cam member 100. The elongated member 104 has an elongated slot 105 is provided therein.

The cam shaft 102 is mounted proximate to the edge of the cylindrical cam member 100, FIGS. 5 and 6, such that the cam shaft 102 is mounted eccentrically on the cam member 100. Each end of the cam shaft 102 is suitably secured to the base plate 80 by retaining brackets 106 such that the cam shaft 102 is rotatable relative to the base plate 80. The retaining brackets 106 are suitably secured to the base plate 80, such as by fasteners. The cam shaft 102 is seated within U-shaped channels 108 in the base plate 80 such that the cam shaft 102 extends partially below the bottom surface of the base plate 80. The cam member 100 extends partially into the cut-out 82 in the base plate 80.

A linear actuator assembly 110 is connected to the cam assembly 98 and to the gear 94. The linear actuator assembly 110 extends over and outwardly from the side wall 86. The linear actuator assembly 110 includes a block 112 and an L-shaped arm 114 which are connected together by suitable means such as fasteners.

A first end of the block 112 has an elongated recess 116 provided therein. The elongated member 104 partially sits within the recess 116. A pin 118 is affixed to the block 112 and extends through the recess 116. The pin 118 is mounted within the elongated slot 105 of the elongated member 104 such that the elongated member 104 can move relative to the block 112.

The L-shaped arm 114 is formed from a first leg 120 and an elongated second leg 122 which is perpendicular to the first leg 120. The first leg 120 is attached to the end of the block 112 which is opposite to the recess 116 by suitable means, such as fasteners.

The second leg 122 has an enlarged section 124 at the end opposite to the joint with the first leg 120. An elongated slot 126 is provided in the enlarged section 124.

The slot 126 extends perpendicularly to the length of the second leg 122. A second elongated slot 128 is provided in the second leg 122, is aligned with the length of the second leg 122 and is perpendicular to the slot 126. The second leg 122 extends over the gear 94. The pin 96 provided on the gear 94 extends into the slot 126.

A pin 129 is provided on the second leg 122 at a position spaced from the slot 126 and on the opposite side of the slot 126 to which slot 128 is provided. The pin 129 extends outwardly from a bottom surface of the second leg 122.

A cover 130 is provided over the gear 94, the portion of the second leg 122 which extends over the gear 94, and the DC motor 90. The cover 130 is suitably attached to the U-shaped mounting member. An elongated slot 132 is provided through the cover 130 at a position over the gear 94 and axial alignment with the axis of the second leg 122. The pin 129 on the second leg 122 is seated within the elongated slot 132. A pin 134 is provided on the cover 130 at a position which is spaced from, but axially aligned with the slot 132. The pin 134 extends upwardly from the cover 130 and is seated within the slot 128 on the second leg 122.

An aperture 136 is provided through the cover 130 through which wiring from the DC motor 90 extends. The wiring from the DC motor 90 is suitably attached to wiring on the electronics side of the contact printer 20.

A pair of spaced apart support rails 138, 140 extend from the top surface of the base plate 80 and are perpendicular thereto. The support rails 138,140 extend from the second end of the base plate 80 to a position which is spaced from the first end of the base plate 80. A slot 142 is provided in support rail 140 proximate to the end which is not attached to the base plate 80. This slot 142 provides means for mounting the pin lift mechanism 24 to the contact printer 20 as further discussed herein.

A generally L-shaped retaining bracket, which includes a first leg 144 and a second leg 146, extends from the top surface of the base plate 180. The first leg 144 is mounted such that a first end thereof is aligned with the first edge of the base plate 80. The second end of the first leg 144 extends between the support rails 138, 140. The second leg 146 extends toward support rail 140.

A pin mounting member 148 is mounted on the upper surface of the base plate 80 by a pair of springs 150. The pin mounting member 148 is generally U-shaped and includes a base wall 152 and a pair of spaced apart side walls 154, 156 which extend upwardly therefrom. The base wall 152 has a raised portion 158 on its lower surface which seats within the cut-out 82. The outer edge of the pin mounting member 148 is flush with the first edge of the base plate 80. The inner edge of the pin mounting member 148 abuts against the second leg 146 of the L-shaped member and the first end of the support rail 140. The pin mounting member 148 forms a seat into which the pin module 26 is seated as described herein. A threaded aperture 160 is formed through the base wall 152 for connection of the pin module 26 thereto.

One of the springs 150 is provided between the base wall 152 of the pin mounting member 148 and the base plate 80 on one side of the cut-out 82 and the other spring 150 is provided between the base wall 152 of the pin mounting member 148 and the base plate 80 on the other side of the cut-out 82. A cover 162 is attached to the first edge of the base plate 80 and to the end surface of the first leg 144 of the L-shaped retaining bracket such that the pin mounting member 148 (the cover 162 has been removed in FIG. 7) is surrounded on three sides.

A pin receptacle 164 is mounted on the base wall 152 of the pin mounting member 148. Wires from the pin receptacle 164 extend through the base wall 152, between the support rails 138, 140, through an aperture in the base plate 80 and out the aperture 136 in the cover 130. The wiring from the pin receptacle 164 is suitably attached to wiring on the electronics side of the contact printer 20.

To attach the pin lift mechanism 24 to the contact printer 20, the slot 142 on the support rail 140 is aligned with the flange 74 and the support rail 140 is slid along the flange 74 until the pin lift mechanism 24 is fully inserted. When fully inserted, the seat formed by the pin mounting member 148 is positioned underneath the cut-out 76 in the generally horizontal plate 68. Thereafter, a cover (not shown) is attached to the outer surface of the vertical plate 70 by suitable means, such as fasteners, to cover the opening 72.

The pin module 26 has a shape which conforms to the seat formed by the pin mounting member 148. The pin module 26 is L-shaped and has an upper portion and a lower portion. A plurality of pins 166 extend from the top surface of the upper portion. The lower portion has a plurality of pins 168 which are capable of mating with the receptacles in the pin receptacle 164. Suitable electrical connections are provided through the pin module 26 between the pins 166 and pins 168. A threaded aperture 170 is provided through the upper and lower portions of the pin module 22 into which a fastener (not shown) is seated when the pin module 26 is attached to the pin lift mechanism 24.

To attach the pin module 26 to the pin mounting member 148 once the pin mounting member 148 is attached to the contact printer 20, the pin module 26 is inserted through the cutout 76 in the generally horizontal plate 68 such that the lower portion is seated on the base wall 152 and between the side walls 154, 156, and the upper portion overlaps side wall 156. The pins 168 on the lower portion mate with the respective receptacles in the pin receptacle 164. The fastener is threaded into the threaded apertures 170, 160. As the fastener is threaded into engagement, the pin module 26 self seats into the pin mounting member 148.

In operation, the printhead assembly 46 is moved to its horizontal position and locked into place by the toggle means 54. The pin module 26 is positioned below the generally horizontal wall 56. When the platen roller 56 starts to rotate up to print speed at the designed ramp acceleration under control by a controller 172 provided on the electronics side of the contact printer 20 and connected to the wiring, the platen roller 56 pulls the media stream from the media supply hangar 64. The RFID labels 22 pass between the printhead support 48 and the generally horizontal plate 68. Once the sensor 60 determines that the front edge of a label 34 is present, this indicates that the programming pad 28 is properly positioned over the pin module 26. The controller 172 sends an instruction to the driver of the platen roller 68 to stop rotation of the platen roller 68.

Thereafter, the pin module 26 is raised. To raise the pin module 26, the controller 172 sends a signal to the DC motor 90. The DC motor 90 is driven to rotate the shaft 92 which, in turn, causes the gear 94 to rotate. The pin 96 pushes against the second leg 122 of the L-shaped arm. As the gear 94 is rotated, the pin 96 slides along slot 126, the pin 129 slides along slot 132, and the pin 134 slides along slot 128 to move the L-shaped arm linearly outwardly. This causes the linear actuator 110 to move linearly toward the first edge of the base plate 80. The pin 118 within the block 112 acts against the elongated member 104 causing the elongated member 104 to move toward the first edge of the base plate 90 and to rotate relative to the block 112. As the elongated member 104 moves and rotates, the pin 118 slides along the length of the slot 105 in the elongated member 104. Rotation of the elongated member 104 causes rotation of the cam shaft 102 and the cam member 100 which are affixed to the elongated member 104. As the cam member 100 rotates, the cam member 100 presses against the raised portion 158 of the pin mounting member 148. This causes the pin mounting member 148 to move upwardly, which causes the pin module 26 to move upwardly through the cutout 76, thereby moving the pins 166 on the pin module 26 into contact with the programming pad 28 on the RFID label 22 that is positioned thereabove. The necessary information is programmed into the RFID label 22 by the controller 172. Suitable control circuitry is provided within controller 172 for programming the RFID label 22.

When the RFID label 22 is being moved through the contact printer 20, the ribbon is also moving through the contact printer 20 in a conventional manner. The ribbon unwinds from the ribbon supply spindle 60 and passes underneath the printhead support 48. The ribbon moves with the media stream and between the media stream and the printhead assembly 46. When the media stream stops moving through the contact printer 20 so that the RFID label 22 can be programmed, the ribbon stops moving as well.

After the necessary information is programmed into the RFID label 22, the pin module 26 is lowered so that the pins 166 do not contact the media stream. To lower the pin module 26, the controller 172 sends a signal to the DC motor 90. The DC motor 90 is driven to rotate the shaft 92 in the opposite direction which causes the gear 94 to rotate in the opposite direction. The pin 96 pushes against the second leg 122 of the L-shaped arm in the opposite direction. As the gear 94 is rotated, the pin 96 slides along slot 126 in the opposite direction, the pin 129 slides along slot 132 in the opposite direction, and the pin 134 slides along slot 128 in the opposite direction to move the L-shaped arm linearly inwardly. This causes the linear actuator 110 to move linearly toward the second edge of the base plate 80. The pin 118 within the block 112 acts against the elongated member 104 causing the elongated member 104 to move toward the second edge of the base plate 90 and to rotate relative to the block 112. As the elongated member 104 moves and rotates, the pin 118 slides along the length of the slot 105 in the elongated member 104. This rotation of the elongated member 104 causes reverse rotation of the cam shaft 102 and the cam member 100 which are affixed to the elongated member 104. As the cam member 100 rotates in this reverse direction, the cam member 100 releases pressure against the raised portion 158 of the pin mounting member 148. This causes the pin mounting member 148 to move downwardly, which causes the pin module 26 to move downwardly through the cutout 76, thereby moving the pins 166 on the pin module 26 out of contact with the media stream.

Thereafter, the controller 172 sends a signal to the driver of the platen roller 56 to rotate the platen roller 56. The platen roller 56 continues to pull the media stream from the media supply hangar 64 and the ribbon resumes its travel. The printhead means 50 uses the ribbon to print the desired indicia on the label 34 of the RFID label 22 as the RFID label 22 passes between the printhead means 50 and the platen roller 68. Thereafter, the RFID label 22 is expelled from the contact printer 20. The tear bar 58 is used for tearing off the printed on RFID label 22 from the remainder of the media stream after it exits the printhead means 50.

The pin mounting member 148 includes two microswitches 174, 176 therein which indicate the upper and lower travel limits of the pin module 26 and thereby indicate the position of the pin module 26 relative to the generally horizontal plate 68. The microswitches 174, 176 are connected to the controller 172 by suitable wiring. Upon startup of the contact printer 20, the controller 172 determines the state of each microswitch 174, 176 to ensure that the pin module 26 is in the proper position. In addition, during operation of the contact printer 20 as described herein, the controller 172 determines the state of each microswitch 174, 176 to ensure that the pin module 26 is in the proper position during operation.

If the pins 166 or 164 on the pin module 26 become worn, the pin module 26 is replaced with a like pin module. The design of the contact printer 20 makes this replacement very easy. To replace the pin module 20, the toggle means 54 are moved from engagement with the printhead assembly 46 and the printhead assembly 46 is pivoted upwardly and away from the generally horizontal plate 68. This exposes the pin module 26. The fastener in the pin module 26 is removed from engagement with the threaded aperture 160 in the pin mounting member 148 and the pin module 26 is removed from the pin mounting member 148. Thereafter, a new pin module is seated within the pin mounting member 148 as described herein.

While slot 132 is described as being in the cover 130 and the pin 129 is described as being provided on the second leg 122, it is to be understood that the slot can be provided in the second leg 122 and the pin can be provided on the cover 130. In addition, while slot 128 is described as being in second leg 122 and the pin 134 is described as being provided on the cover 130, it is to be understood that the slot can be provided in the cover second 130 and the pin can be provided on the second leg 122.

While slot 105 is described as being in the elongated member 104 and the pin 118 is described as being provided on the block 112, it is to be understood that the slot can be provided in the block 112 and the pin can be provided on the elongated member 104.

While a preferred embodiment of the present invention is shown and described, it is envisioned that those skilled in the art may devise various modifications of the present invention without departing from the spirit and scope of the appended claims.

The invention claimed is:

1. A printer for programming an RFID label, the RFID label including a transponder, said printer comprising:
    a housing;
    a support wall provided within said housing;
    a printhead support attached to said support wall;
    printhead means provided on said printhead support;
    a platen roller attached to said support wall;
    a pin lift mechanism including a base plate, a pin mounting member which can be moved relative to said base plate, and means for moving said pin mounting member;
    means for supporting said pin lift mechanism, said supporting means being attached to said support wall;
    a pin module releasably mounted to said pin mounting member, said pin module including a plurality of pins which can be moved into engagement with the transponder of the RFID label by movement of said pin mounting member;
    an electronic controller; and
    means for providing communication between said pins of said pin module and said electronic controller.

2. A printer as defined in claim 1, further including a thermal ribbon, said printhead means using said thermal ribbon to print indicia on the RFID label.

3. A printer as defined in claim 2, further including a ribbon supply spindle and a ribbon take-up spindle.

4. A printer as defined in claim 1, wherein said means for moving said pin mounting member comprises a motor, a gear driven by said motor, a linear actuator connected to said gear and a cam assembly connected to said linear actuator, said cam assembly contacting said pin mounting member and being capable of moving said pin mounting member.

5. A printer as defined in claim 4, wherein said cam assembly includes a cylindrical cam and a shaft eccentrically mounted on said cylindrical cam.

6. A printer as defined in claim 5, wherein said linear actuator includes an arm having a first end and a second end, said first end being connected to said gear, and wherein said cam assembly includes a member connected to said first end of said arm, said first end of said arm and said member having means for connecting said arm and said member and for allowing relative movement between said arm and said member.

7. A printer as defined in claim 6, wherein said connecting means comprises a pin provided in said first end of said arm, and said member having a slot provided therein in which said pin is mounted.

8. A printer as defined in claim 6, wherein said gear has a pin extending therefrom, and said second end of said arm includes a slot therein in which said pin is provided.

9. A printer as defined in claim 6, wherein said arm has a pin extending therefrom, and further including a cover provided over said gear and said second end of said arm and connected to said base plate, said cover having a slot therein in which said pin on said arm is provided.

10. A printer as defined in claim 9, wherein said cover further includes a pin extending therefrom and said arm includes a slot therein in which said pin on said cover is mounted.

11. A printer as defined in claim 4, wherein said linear actuator includes an arm having a first end a second end, said second end being connected to said gear, a member connected to said first end of said arm, said first end of said arm and said member having means for connecting said arm and said member and for allowing relative movement between said arm and said member.

12. A printer as defined in claim 11, wherein said connecting means comprises a pin provided in said first end of said arm, and said member having a slot provided therein in which said pin is mounted.

13. A printer as defined in claim 11, wherein said gear has a pin extending therefrom, and said second end of said arm includes a slot therein in which said pin is mounted.

14. A printer as defined in claim 11, wherein said arm has a pin extending therefrom, and further including a cover provided over said gear and said second end of said arm and connected to said base plate, said cover having a slot therein in which said pin on said arm is mounted.

15. A printer as defined in claim 14, wherein said cover further includes a pin extending therefrom and said arm includes a slot therein in which said pin on said cover is mounted.

16. A printer as defined in claim 1, further including a tear bar proximate to said platen roller.

17. A printer as defined in claim 1, further including a sensor for determining the position of the label relative to said pin module, said sensor being in communication with said electronic controller.

18. A printer as defined in claim 1, further including at least one microswitch for indicating the position of said pin module relative to said means for supporting said pin lift mechanism, said at least one microswitch being in communication with said electronic controller.

19. A printer as defined in claim 1, wherein said supporting means includes a wall which generally extends from said platen roller, said wall having an aperture therethrough through which said pin module can move.

20. A printer for programming an RFID label, the RFID label including a transponder, said printer comprising:
    a housing;
    a support wall provided within said housing;
    a printhead support attached to said support wall;
    printhead means provided on said printhead support;
    a platen roller attached to said support wall;
    a pin lift mechanism including a base plate, a pin mounting member which can be moved relative to said base plate;

means for moving said pin mounting member comprising a motor, a gear driven by said motor, a linear actuator connected to said gear and a cam assembly connected to said linear actuator, said gear having a pin extending therefrom, said linear actuator including an arm having a first end and a second end, said second end of said arm including a first slot therein in which said pin extending from said gear is mounted, said arm including a second slot, said arm having a first pin extending therefrom and a second pin connected thereto, said cam assembly contacting said pin mounting member, said cam assembly including a cylindrical cam, a shaft eccentrically mounted on said cylindrical cam, a member connected to said second end of said arm, said member having a slot provided therein in which said second pin on said arm is mounted, a cover provided over said gear and said second end of said arm and connected to said base plate, said cover having a slot therein in which said first pin on said arm is provided, said cover further including a pin extending therefrom and mounted within said slot in said arm;

means for supporting said pin lift mechanism, said supporting means being connected to said support wall;

a pin module releasably mounted to said pin mounting member, said pin module including a plurality of pins which can be moved into engagement with the transponder of the RFID label by movement of said pin mounting member;

an electronic controller; and means for providing communication between said pins of said pin module and said electronic controller.

21. A printer for programming an RFID label, the RFID label including a transponder, said printer comprising:

a housing;

a support wall provided within said housing;

a printhead support attached to said support wall;

printhead means provided on said printhead support;

a platen roller attached to said support wall;

a pin lift mechanism including a base plate, a pin mounting member which can be moved relative to said base plate, and means for moving said pin mounting member;

means for supporting said pin lift mechanism, said supporting means being connected to said support wall;

a pin module releasably mounted to said pin mounting member, said pin module including a plurality of pins which can be moved into engagement with the transponder of the RFID label by movement of said pin mounting member;

an electronic controller;

means for providing communication between said pins of said pin module and said electronic controller;

a sensor for determining the position of the label relative to said pin module, said sensor being in communication with said electronic controller; and at least one microswitch for indicating the position of said pin module relative to said means for supporting said pin lift mechanism, said at least one microswitch being in communication with said electronic controller.

22. A printer as defined in claim 21, wherein said supporting means includes a wall which generally extends from said platen roller, said wall having an aperture therethrough through which said pin module can move.

* * * * *

UNITED STATES PATENT AND TRADEMARK OFFICE
CERTIFICATE OF CORRECTION

PATENT NO. : 6,481,907 B2
DATED : November 19, 2002
INVENTOR(S) : Matthew Banach et al.

It is certified that error appears in the above-identified patent and that said Letters Patent is hereby corrected as shown below:

<u>Title page,</u>
Item [73], Assignee, should read -- ZIH Corp., a Delaware Corporation with it's principal office in Hamilton, Bermuda. --

Signed and Sealed this

Twenty-first Day of October, 2003

JAMES E. ROGAN
*Director of the United States Patent and Trademark Office*